Aug. 7, 1928. Re. 17,058

C. G. HAWLEY

LOCOMOTIVE STEAM PURIFIER

Original Filed May 4, 1925

INVENTOR

Charles G. Hawley by Mason & Mason ATTORNEYS.

Reissued Aug. 7, 1928. Re. 17,058

UNITED STATES PATENT OFFICE.

CHARLES GILBERT HAWLEY, OF CHICAGO, ILLINOIS, ASSIGNOR TO CENTRIFIX CORPORATION, OF CLEVELAND, OHIO, A CORPORATION OF OHIO.

LOCOMOTIVE STEAM PURIFIER.

Original No. 1,668,905, dated May 8, 1928, Serial No. 27,852, filed May 4, 1925. Application for reissue filed May 26, 1928. Serial No. 280,863.

My invention relates to locomotive boilers and the like, having steam domes from which the steam is taken, and more especially this invention relates to means for "drying" the steam before it is permitted to leave the boiler.

The object of the invention is to provide a simple and effective steam purifier or dryer adapted for employment directly within the dome of a boiler and, further, to provide a steam purifying apparatus that may be installed and removed without disturbing any part of the boiler and with a minimum of labor. Other objects of the invention will appear hereinafter.

Figure 1:
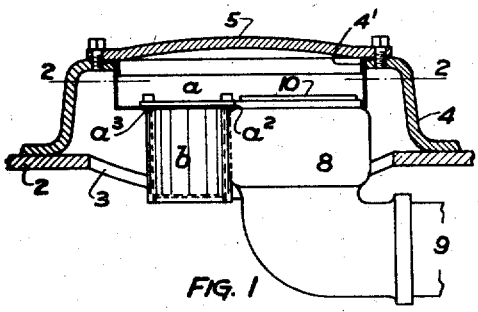
Figure 3:
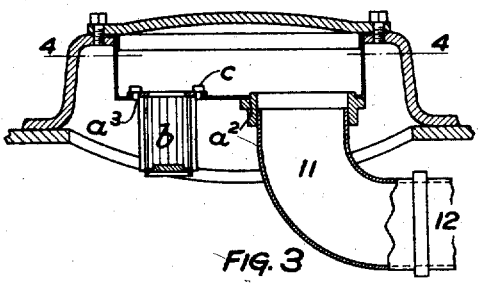
Figure 2:
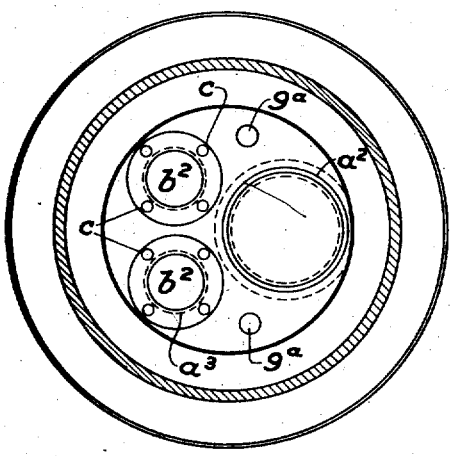
Figure 4:
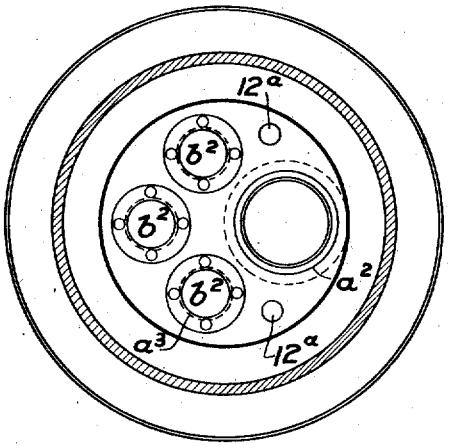
Figure 7:
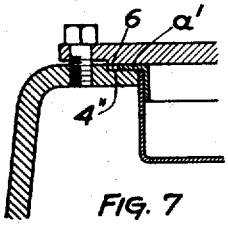
Figure 5:
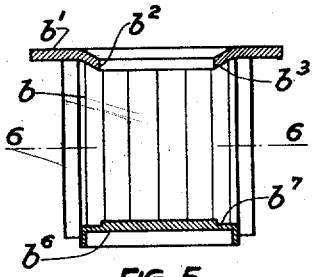
Figure 6:
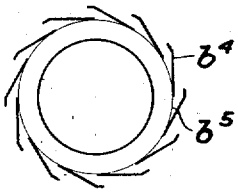

The invention will be readily understood on reference to the accompanying drawing, in which Fig. 1 is a vertical longitudinal section of the domed top of a locomotive boiler; Fig. 2 is a sectional view thereof on the line 2—2 of Fig. 1; Fig. 3 is like unto Fig. 1 but shows the purifier or steam dryer directly serving the dry pipe of the boiler, it being assumed that the throttle valve is in the "front-end" of the boiler; Fig. 4 is a sectional view on the line 4—4 of Fig. 3; Fig. 5 is a vertical section of one of the centrifugal steam purifying units; Fig. 6 is a section thereof on the line 6—6 of Fig. 5; Fig. 7 is an enlarged sectional detail showing how the pan portion of the device is supported.

The part 2 in Fig. 1 represents the top of a locomotive boiler shell containing the large opening 3 which is covered by the dome 4. The top of the dome contains the usual large central opening 4′ and is closed by the usual dome cap 5.

The groove 4″ and the packing 6 between the dome-top and the cap are best shown in Fig. 7.

The part 8 represents an ordinary throttle valve box on the rear end of the boiler dry pipe 9. It contains the throttle valve 10. The structure of Fig. 3 is identical with that of Fig. 1 except that the throttle box is replaced by the upturned steam receiving elbow 11 belonging to the dry pipe 12. In both cases the steam from the upper part of the boiler rises into the dome and thence passes down into the dry pipe, the openings of the dry pipe being placed as high as possible above the steam disengagement surface.

According to my invention a steam drying or purifying device is so interposed that the steam must pass through it and be relieved of its burden of moisture and solids before the steam reaches the dry pipe. This novel steam purifying device comprises only two parts; or, more exactly, parts of two kinds, for one of the parts may be duplicated.

The larger part comprises a shallow metal pan $a$ of a size to drop down through the hole in the top of the dome. The pan is supported by a top flange $a'$ which rests in the packing groove 4″, and is fastened by the dome cap. The bottom of the pan contains a hole $a^2$ and fits down over the top of the throttle box 8, or over the top of the elbow 11. In the absence of a tight fit suitable packing may be used between the pan bottom and the part 8 or 11 on which it fits. No very tight joint is required for as will appear the interior of the pan is always in free communication with the steam space of the boiler.

The remaining portions of the pan bottom contain, first, openings $9^a$ or $12^a$ for the upper ends of such auxiliary dry pipes as may be found in the dome, and, second, one or more holes $a^3$ for the centrifugal separator units $b$. That unit or units comprise the other or duplicated part of the steam purifier.

The preferred construction of the centrifugal unit $b$ is clearly disclosed in Figs. 5 and 6 and it comprises a top ring $b'$ containing a steam outet opening $b^2$ and preferably characterized by a downwardly and inwardly pitched under surface $b^3$, together with the multiple tangential tuyère ring or barrel. The latter has an internal diameter considerably greater than that of the opening $b^2$; thus to present the overhanging annular shoulder or abutment $b^3$ at the top of the tuyère ring. The tuyère ring is composed of a circumferential series of operatively overlapping tangential tuyère blades $b^4$. These form the long slit-like tangential tuyères $b^5$ which reach from top to bottom of the tuyère ring. The lower end of the tuyère ring is occupied by the closure $b^6$ preferably characterized by the peripheral groove $b^7$. Each unit hangs through an opening $a^3$ in the bottom of the pan $a$. The extended margin $b'$ of the ring rests on and is fastened to the bottom of the pan, as by a plurality of bolts $c$.

If a single unit is employed the opening $b^2$ in the top thereof should slightly exceed the cross sectional area of the throttle valve when fully opened. As a rule it is more practical to employ several smaller centrifugal units, and in such cases, the outlet openings $b^2$ thereof likewise aggregate an area in excess of that called for by the throttle valve and dry pipe. Next, in each case, the aggregate area of the long tuyères $b^5$ is preferably greater than the area of the opening $b^2$ and may be double that area.

Upon the removal of the dome cap the units $b$ may be lifted from the pan, as for purposes of inspection or replacement. When the dome cap is taken off and the pan $a$ is removed, a mere matter of lifting the pan out of the dome, the dome is left entirely free and a workman may enter the boiler through the dome. In other words, the addition of the described freely removable parts does not complicate or change the boiler construction in any particular.

It will at once be evident that the tuyères $b^5$ and the top openings $b^2$ of the centrifugal units are constantly open and that as they are adequate dimensions, the pressure within the pan will always be the same as that in the steam space of the boiler.

When the throttle valve of the dry pipe is closed there is no movement of steam through the units or pan, but upon the opening either of the main throttle valve, or of a valve associated with an auxiliary dry pipe, the steam starts to flow through the tangential tuyères of the unit or units $b$. Due to the tangential entrance of the streams of steam they are caused to immediately impact the surfaces of succeeding blades. Furthermore, the tangential entrance of the streams causes the body of steam within the unit to take on a very rapid whirling movement. These operations result in centrifugally separating the heavier moisture globules and particles of solid matter, leaving them upon the inner surfaces of the tuyère blades and in much the same whirling condition as the steam. The overhanging annular abutment $b^3$ prevents the upward movement of the collected substances, downward reaction taking place and there is a continuous delivery of the heavier substances to the periphery of the bottom or closure $b^6$, and thence back into the boiler.

The steam being freed from this burden moves into the pan in a dry state, and, within the limits of locomotive practice, the greater the volume of steam, the greater its velocity through the fixed centrifugal units and the better the assurance of dryness.

The novel structure taken as a whole is not only complete in itself, so that it may be easily removed, and put back into the dome as a unit, but it is practically self-cleaning, and so little subjected to wear that it retains its effectiveness after long periods of use.

Having thus described my invention I claim as new and desire to secure by Letters Patent:

1. A boiler dome and dome cap, in combination with a dry pipe leading from said dome, a removable pan in said dome, and one or more centrifugal separators depending from the bottom of said pan, said pan receiving the upper end of said dry pipe and said separators and pan forming the avenue through which the steam must pass to reach said dry pipe.

2. A boiler dome and dome cap, in combination with a dry pipe leading from said dome, a removable pan in said dome and receiving the upper end of said pipe, one or more centrifugal separators depending from the bottom of said pan and forming the avenue through which the steam must pass to reach said pan and dry pipe, each said unit being formed and adapted to throw the separated moisture back into the boiler.

3. A boiler dome having an opening in its top, in combination with a dome cap normally closing said opening, a dry pan hanging within said dome from the margin of the opening in the top of the dome and held by said cap, and a steam purifying means hanging from said pan.

4. A boiler dome having an opening in its top, in combination with a dome cap normally closing said opening, a dry pan hanging within said dome and held by said cap, the bottom of said pan containing a steam outlet, the bottom of said pan also containing one or more steam inlet openings and steam purifying devices hanging from the bottom of said pan at the respective steam inlet openings.

5. A boiler dome and dome cap, in combination with a dry pan hanging within said dome and held by said cap, said pan and cap completing a dry steam chamber, in combination with one or more centrifugal steam purifying devices hanging from the bottom said pan and through which the steam enters the pan.

6. A boiler having an opening in the top of its shell, in combination with a steam dome positioned above and closing said opening, a plurality of dry pipes rising through said opening and into said dome, centrifugal steam drying means positioned in said dome and including a dry steam compartment from which alone said dry pipes are supplied with steam.

7. A boiler having an opening in the top of its shell, in combination with a steam dome positioned above and closing said opening, a plurality of dry pipes rising through said opening and into said dome, centrifugal steam drying means positioned in said dome, a supporting structure for said drying means, and said structure together with parts of said dome forming a dry steam compartment from which alone said dry pipes are supplied with steam.

8. A steam boiler having an opening in the top of its shell, in combination with a steam dome positioned above and closing said opening, means cooperating with a portion of the enclosing wall of said dome to form a dry steam compartment within said dome, centrifugal steam drying means also positioned in said dome and wholly in advance of and communication with said compartment, whereby moisture is excluded from said compartment and only dry steam is supplied thereto, and a dry pipe rising through said opening into said dome and in communication with said compartment.

9. A steam boiler having an opening in the top of its shell, in combination with a steam dome positioned above and closing said opening, a horizontal floor structure within said dome and containing a steam entrance and a steam exit in substantially the same horizontal plane below the top of said dome, said structure and dome together forming a dry steam compartment in the upper part of the dome, a steam purifier positioned at said steam entrance and depending from said structure, and, a dry pipe rising through the opening in the shell and having an upper end which occupies the said steam exit in the floor structure.

10. A boiler having an opening in the top of its shell, in combination with a steam dome positioned above and closing said opening, a plurality of dry pipes rising through said opening and into said dome, centrifugal steam drying means positioned in said dome and including a dry steam compartment from which alone said dry pipes are supplied with steam, said steam drying means being constructed and arranged for conducting the separated moisture therefrom.

In witness whereof, I have hereunto set my hand this 25th day of May, A. D. 1928.

CHARLES GILBERT HAWLEY.